No. 631,191. Patented Aug. 15, 1899.
A. K. WESTERDAHL.
STORAGE BATTERY CELL.
(Application filed June 24, 1898.)
(No Model.)
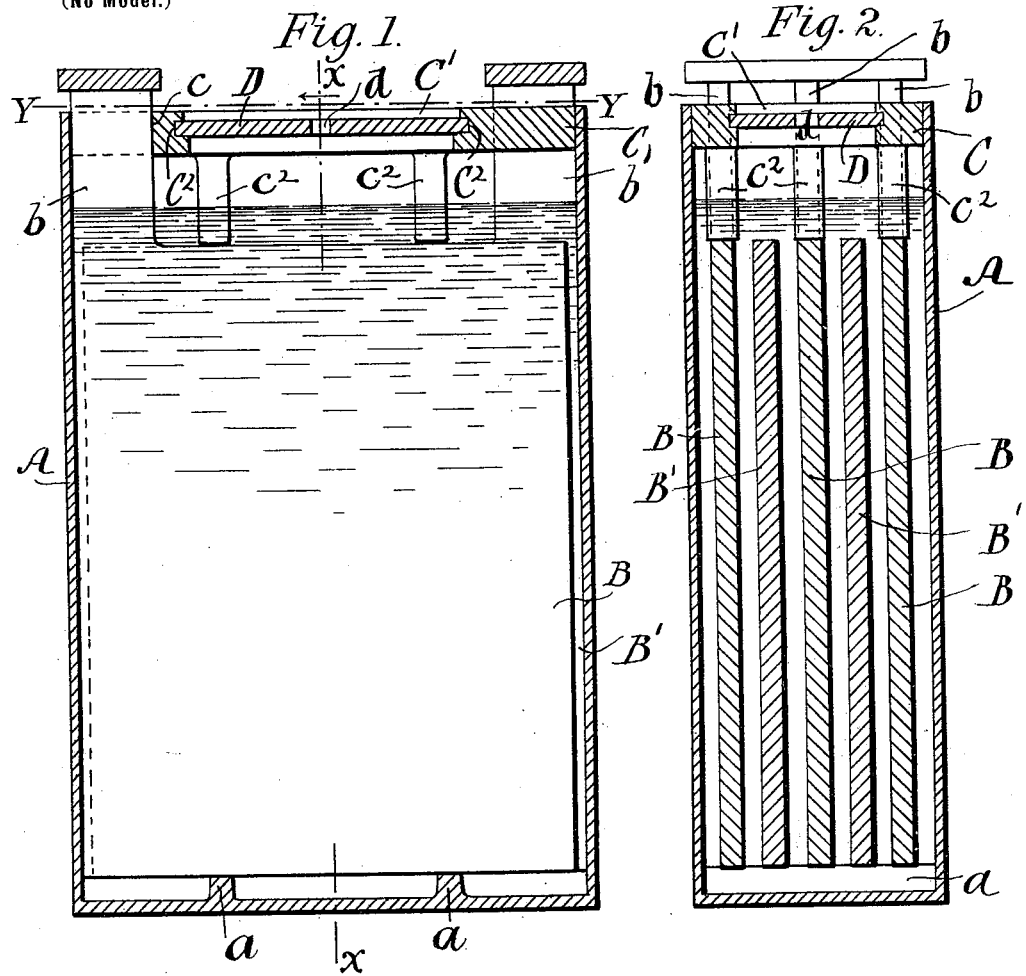
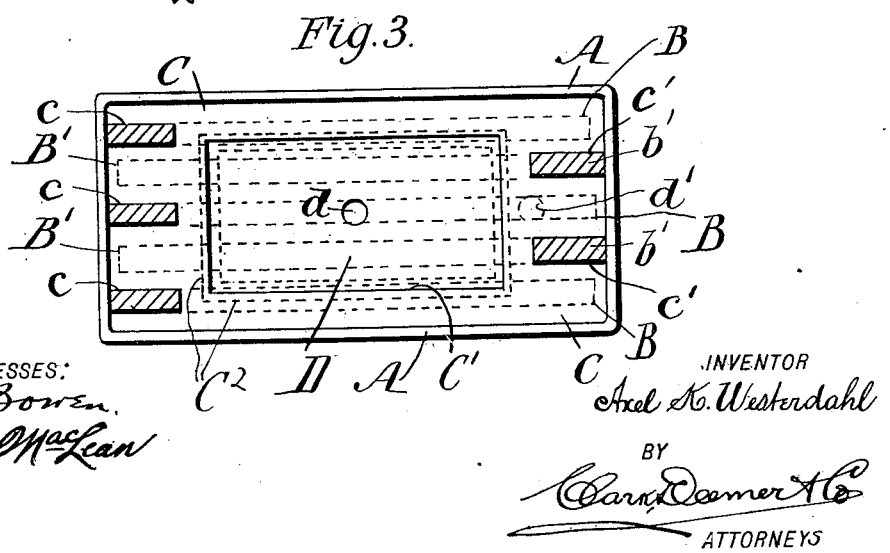
WITNESSES:
J. S. Bowen
M. G. MacLean
INVENTOR
Axel K. Westerdahl
BY
Carr, Deemer & Co.
ATTORNEYS

United States Patent Office.

AXEL K. WESTERDAHL, OF NEW YORK, N. Y.

STORAGE-BATTERY CELL.

SPECIFICATION forming part of Letters Patent No. 631,191, dated August 15, 1899.

Application filed June 24, 1898. Serial No. 684,396. (No model.)

*To all whom it may concern:*

Be it known that I, AXEL K. WESTERDAHL, a citizen of the United States, and a resident of New York city, county of New York, and State of New York, have invented certain new and useful Improvements in Storage Batteries and Cells, of which the following is a specification, reference being had to the accompanying drawings, forming a part thereof, in which similar letters of reference indicate corresponding parts.

This invention relates to improvements in storage batteries and cells; and the object thereof is to facilitate the operation of opening and closing the cells, whereby they may be quickly filled, cleaned, and effectively closed without the necessity of using a sealing compound.

The invention will be hereinafter fully described, and specifically set forth in the annexed claims.

In the accompanying drawings, forming part of this specification, Figure 1 is a vertical sectional elevation of a battery-cell embodying my improvement. Fig. 2 is a vertical sectional elevation taken on the line $x\ x$ of Fig. 1, and Fig. 3 is a sectional plan view taken on line $y\ y$ of Fig. 1.

In the practice of my invention I employ an ordinary box or casing A, of hard rubber or other suitable material. This box has projections $a$ formed integrally upon the bottom thereof, upon which the plates B and B' are adapted to rest. These plates are of the usual L shape, having projections $b$ and $b'$ extended upwardly beyond the edge of the box for the purpose of making connections. For closing the cells I employ a soft-rubber plate C, having apertures $c$ and $c'$ cut therein for engagement with the projections $b$ and $b'$ of the battery-plates B and B'.

Located centrally of the flexible plate C is a rectangular opening C', and engaging an interior groove $C^2$ of the plate C is a plate or cover D, composed, preferably, of transparent glass, permitting inspection of the interior of the cell. Any other suitable insulating material may be employed, if desired, such as hard rubber, porcelain, &c. This said plate D is of an area slightly larger than the groove $C^2$, whereby when it is forced within the said groove the opening in the plate C is expanded and its outer edges are forced into secure engagement with the inner walls of the box A and with the extensions of the battery-plates, thus providing an efficient cover to prevent leakage of the fluid contained within the cells.

The removable cover is preferably located exactly at the upper edge of the casing A, and to maintain it in alinement therewith integrally-formed projections $c^2$ are extended from the lower surface of the flexible plate C, and they rest upon the upper edges of the battery-plates. The plate D, forming part of the removable cover, is preferably supplied with an opening $d$, adapted for venting the cells and for filling the same. If desired, this opening may be made through the flexible plate C, as illustrated by dotted lines $d'$, Fig. 3 of the drawings.

In the operation and use of the device the plates B and B' are set within the casing A, as illustrated in the drawings. The flexible plate C is then placed in position, after which the plate D is forced into engagement with the groove $C^2$, thus providing an effective and water-tight cover for the cells, which can be readily removed when desired for the purpose of cleaning the cells and the battery-plates, and it is obvious that the cover may be again attached after the cells are replaced, and inasmuch as no cement is used the operation of opening and closing the cells is greatly facilitated.

It will be specially noticed that the elastic or yielding marginal cover-plate C is forced closely to the main casing-walls and to the walls of the battery-plate or other cell-studs $b$ and $b'$ by lateral expansion caused by direct lateral pressure of the harder central cover-plate D and without the aid of metallic or other clamping devices of any kind, whereby a most simple, easy, and effective closure of the cell is obtained by desirable non-metallic parts not affecting the contents of the cell and unaffected by them.

My invention may of course be adapted to cover battery-cells having a round or other-shaped mouth or opening and interior elements of any character, as will be readily understood.

Having thus described my invention, what I claim as new, and desire to secure by Letters Patent, is—

1. A battery-cell cover comprising an elastic or yielding marginal portion having openings admitting the battery-element studs or projections and also having a central opening, and a harder interior portion adapted to forcibly enter said central opening and thereby expand the marginal portion by direct lateral pressure to the cell-walls and element studs, substantially as described.

2. A battery-cell cover comprising an elastic or yielding plate, having openings admitting the terminal connectors, and also a central opening having a ledge formed therein, and a rigid plate adapted to be forced into said central opening to close the same, substantially as set forth.

3. A battery-cell cover comprising an elastic plate, having openings at the edge admitting the projections of the cell-grids and also a central opening, a rigid plate adapted to forcibly enter and close said central opening, and projections integral with said elastic plate bearing on the top of the cell-grid to retain the elastic plate in proper position when said rigid plate is being forced into said central position, substantially as and for the purposes set forth.

In testimony that I claim the foregoing as my invention I have signed my name, in presence of two witnesses, this 22d day of June, 1898.

AXEL K. WESTERDAHL.

Witnesses:
M. G. McCLEAN,
SADIE RUBINSTEIN.